Jan. 12, 1943.  F. A. GAUGER  2,308,275
AUTOMATIC VALVE AND SYSTEM OF CONTROL THEREFOR
Filed May 6, 1938  3 Sheets-Sheet 1
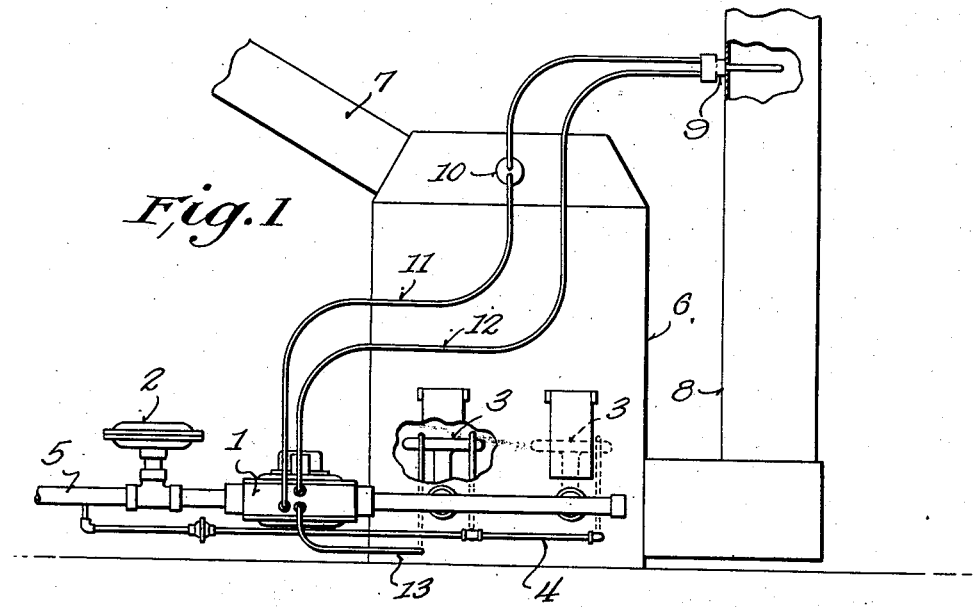
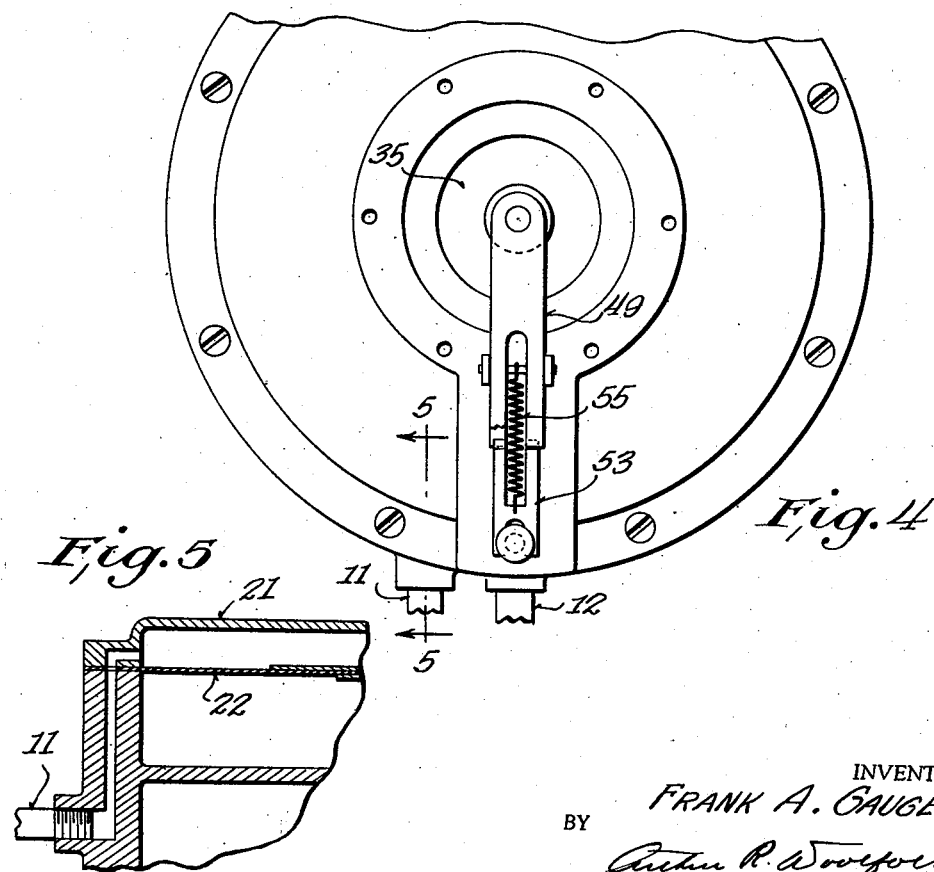
INVENTOR.
FRANK A. GAUGER
BY
ATTORNEY.

Jan. 12, 1943. F. A. GAUGER 2,308,275
AUTOMATIC VALVE AND SYSTEM OF CONTROL THEREFOR
Filed May 6, 1938 3 Sheets-Sheet 2
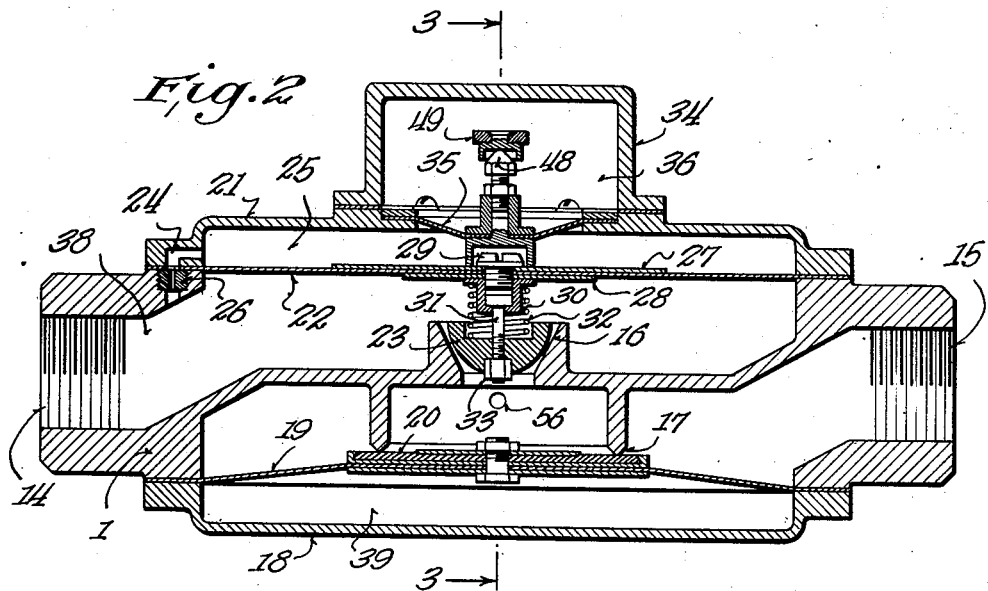
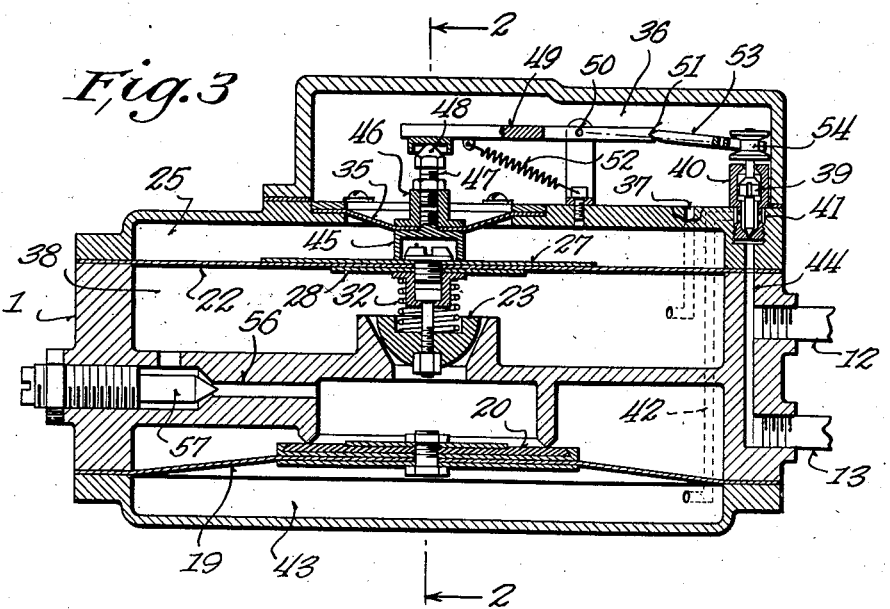
INVENTOR.
FRANK A. GAUGER
BY
ATTORNEY.

Jan. 12, 1943.  F. A. GAUGER  2,308,275
AUTOMATIC VALVE AND SYSTEM OF CONTROL THEREFOR
Filed May 6, 1938  3 Sheets-Sheet 3
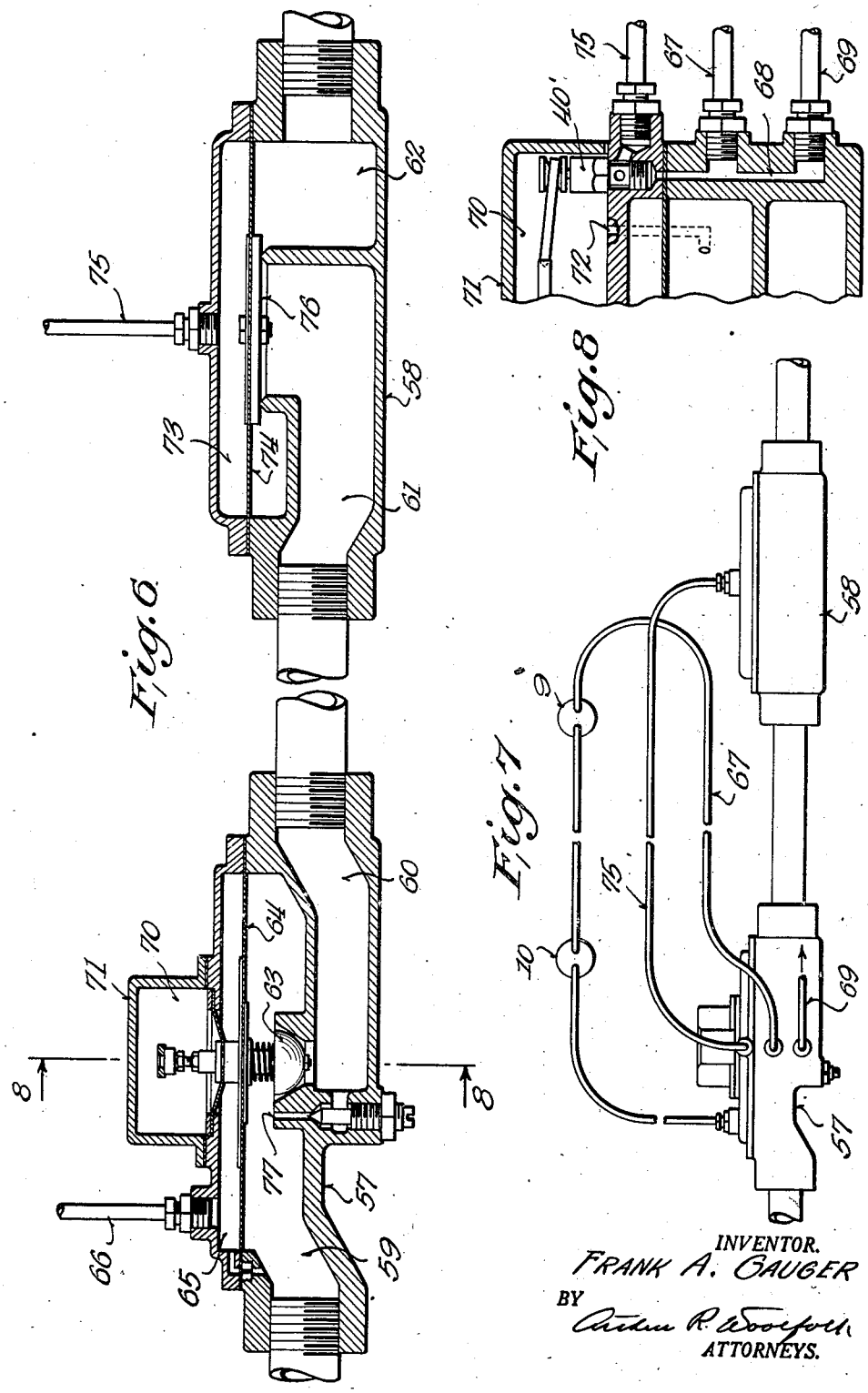
INVENTOR.
FRANK A. GAUGER
BY
ATTORNEYS.

Patented Jan. 12, 1943

2,308,275

UNITED STATES PATENT OFFICE 2,308,275

AUTOMATIC VALVE AND SYSTEM OF CONTROL THEREFOR

Frank A. Gauger, Milwaukee, Wis., assignor to Minneapolis-Honeywell Regulator Company, Minneapolis, Minn., a corporation of Delaware Application May 6, 1938, Serial No. 206,486

10 Claims. (Cl. 236—80)

This invention relates to automatic valves and systems of control therefor.

The main object of this invention is to provide a novel form of automatic modulating valve which has a throttle valve and a main valve, and in which the throttle valve fully opens prior to the opening of the main valve, and in which the throttle valve executes its throttling action prior to the closing of the main valve.

More specifically objects of this invention are to provide a novel form of modulating valve in which a throttle valve is controlled from temperature so that it responds to temperature variations, and in which the fluid flow that is to be controlled by the throttle valve is also controlled by a main valve in series with the throttle valve, but in which the main valve is under the control of a lost motion valve which may or may not be a quick motion valve, the arrangement being such that the throttle valve completely opens prior to the opening of the main valve and executes its throttling action prior to the closing of the main valve, the invention having a further detailed object of providing a minimum flow around the throttle valve but under the direct control of the main valve so that when the main valve finally closes, it cuts off even the minimum flow.

Further objects are to provide a modulating valve having a throttle valve and a main valve as hereinabove decribed which may be made either as a unitary structure or as two separate valves but interconnected so that they are operatively tied together and perform their operations in the correct order or sequence.

Further objects are to provide a throttle valve which has operating means moving the throttle valve in a graduated manner in response to temperature variations and a main valve in series with the throttle valve, said main valve being controlled by a lost motion valve, in which the lost motion valve is adjustable to determine the temperature range between which the main valve opens and closes, and in which the throttle valve may be adjusted to accommodate one or more burner sections.

Embodiments of the invention are shown in the accompanying drawings, in which:

Figure 1 is a schematic view showing the valve associated with a furnace and a temperature controlled system.

Figure 2 is a sectional view through the valve, such view corresponding to a section on the line 2—2 of Figure 3.

Figure 3 is a sectional view through the valve corresponding to a section on the line 3—3 of Figure 2.

Figure 4 is a view of the valve with the top casing removed showing the lost motion valve mechanism.

Figure 5 is a sectional detail showing the bleed line port for the valve.

Figure 6 is a view corresponding to Figure 2 but showing a further form that the valve may take.

Figure 7 is a view showing the manner in which the two valves are interconnected.

Figure 8 is a fragmentary sectional detail of the lost motion valve and the associated parts for the form of the invention shown in Figures 6 and 7.

Referring to the drawings, particularly Figure 1, it will be seen that the valve comprises a body portion 1 which is connected between the pressure regulating valve 2 and the burners 3. The usual pilot line is indicated by the reference character 4 and extends to the gas main 5 on the outer side of the pressure regulating valve in accordance with the best practice.

The valve has been shown as controlling the burners for a furnace 6 which may have hot air ducts, one of which is indicated at 7, and a cold air return 8. A gas thermostat 9 of the usual and well known construction is positioned in the cold air return 8 and a limit gas thermostat 10 is positioned in the bonnet of the furnace. Both of these thermostats control the bleed line 11 leading from the valve and allowing gas to leak through the bleed line to the exhaust line 12, which in turn leads to the exhaust pipe 13 extending upwardly into proximity to one of the burners.

The valve is provided with an inlet port 14 and an outlet port 15. Between these ports a double valve seat is provided. The upper valve seat is indicated by the reference character 16 and is the throttle valve seat and the lower valve seat indicated by the reference character 17 is the main valve seat for the on-and-off main valve. It is to be noted that these valves are in series.

The body portion 1 is provided with a lower or bottom casing 18 which clamps between itself and the body portion a diaphragm 19 for operating the main on-and-off valve 20. A casing 21 is located on the upper side of the main body portion and clamps between itself and such main body portion a diaphragm 22 for operating the throttle valve 23. A feed port 24 is provided for connecting the chamber 25 above the diaphragm 22 with the pressure gas and a graduated apertured plug 26 is provided for determining the size of the bleed hole and consequently the rate of flow into the chamber 25.

Metal plates 27 and 28 are positioned on opposite sides of the diaphragm 22 and these plates are locked together in any suitable manner, as by means of the screw 29 and the fitting 30. The throttle valve 23 is slidably mounted on a small stem 31 which is headed and seated within the fitting 30 so that there is a limited motion that the diaphragm 22 may make after the throttle valve 23 has seated, a spring 32 being provided between the fitting 30 and the throttle valve 23 so as to yeildingly hold the throttle valve down at its lowest adjustment relative to the diaphragm 22.

The position of the diaphragm 22 is controlled by temperature responsive means hereinafter described. It is obvious, therefore, that the throttle valve 23 should have a higher adjustment for a plurality of burner sections than when it controls a single burner section. This is readily accomplished by providing a nut or other suitable member 33 which is screw threaded on the stem 31 and thereby allows the adjustment of the throttle valve 23 relative to the diaphragm 22 to accommodate one or more burner sections.

An uppermost casing 34 is positioned above the casing 21 and a flexible sealing member or diaphragm 35 is interposed between the two casings so as to separate off the chamber 25 from the chamber 36 within the casing 34.

Referring to Figure 3, it will be seen that the chamber 36 is supplied with pressure gas through the port 37 which leads into the pressure gas supply chamber 38 in the valve body.

A three-way lost motion valve indicated generally at 39 is provided and has a valve cage 40 provided with an annular outlet port 41 communicating by means of a port 42 with the chamber 43 below the main valve diaphragm 19. The three-way valve allows gas pressure to be admitted from the casing 36 to the chamber 43 when the lost motion three-way valve 39 is in the position shown in Figure 3. When the valve 39 is at the uppermost portion of its stroke, it connects the chamber 43 with the exhaust passage 44 which leads to the waste pipe 13, the pipe 12 hereinbefore described also communicating with this waste pipe.

A cup-shaped fitting 45 bears against the top metal plate 27 of the diaphragm 22 and has an upwardly extending threaded shank which receives the nut 46. The nut 46 also carries an adjustment screw or threaded standard 47 which may be locked thereto by means of the lock nut shown and which terminates in an upper rounded or conical head 48. The head 48 forms an operating member for the lever 49 pivoted as indicated at 50 and having an outer notched end 51. This lever is spring urged downwardly by the loading spring 52.

A member 53 is provided with a pointed end which loosely seats within the notch 51 at one end and at the other end is forked and fits between the upper and lower flanges of the member 54 rigid with the lost motion valve 39. This mechanism constitutes a lost motion mechanism and thereby makes the valve 39 a lost motion valve. It is more clearly shown in Figure 4 where it will be seen that the member 53 is in reality bifurcated at its pointed end and thereby providing two spaced bearing surfaces fitting within the notches on the bifurcated end of the lever 49. A spring 55 is interposed between the member 53 and the lever 49 so that when the lever 49 is rocked in a clockwise direction, as viewed in Figure 3, the spring 55 will pass dead center and raise the valve 39. On the reverse motion when the spring is carried past dead center, the valve 39 will be thrust downwardly into the position shown in Figure 3.

It is to be noted particularly that there is a range of motion that the diaphragm 22 can execute before the valve 39 operates, as this valve 39 is a lost motion valve which, in the form chosen for illustration, has been shown as a quick motion, lost motion valve. It need not, however, be a quick motion valve but it must be a lost motion valve.

It is to be noted that the position of the diaphragm 22 is dependent upon the temperature controlling the gas thermostats 9 and 10, the thermostat 10 merely constituting a limit thermostat. The thermostat 9 is usually the only thermostat in actual active control in accordance with the well known practice. Inasmuch as the position of the diaphragm 22 is dependent on the temperature, it is obvious that the range through which the lost motion valve will operate for its upper and lower position will be determined by the setting of the threaded shank 47.

Minimum flow means in the form of a by-pass 56 around the throttle valve is provided and is controlled by the needle valve 57. This minimum flow, however, is always under the direct control of the main valve 20 so that when the main valve is closed, even this minimum flow is completely cut off.

The operation of the apparatus is as follows: Assuming that the main valve is closed and the temperature is falling. Gas will be allowed to leak past the gas thermostats from the chamber 25, allowing the diaphragm 22 to slowly rise and to thereby slowly raise the throttle valve 23. After the throttle valve has fully opened, the lost motion valve 39 will move to its upper position and connect the chamber 43 below the main valve diaphragm 19 to the exhaust pipe 13 and allow the main valve to suddenly drop open.

There is thus a full flow of gas to the burners so that there is no chance of flash-back during lighting. The gas thermostat immediately takes charge of the throttle valve and lowers the throttle valve to the desired position and the throttle valve can move up or down, executing its full range of throttling action without operating the lost motion valve 39 and consequently without operating the main valve which is under the control of the lost motion valve 39.

After the throttle valve has throttled down to its lowest position, there is still a minimum flow through the minimum flow duct 56 to the burners. If, however, this minimum flow supplies more heat than is needed, the diaphragm 22 continues downwardly and operates the lost motion valve 39 to lower it and allow pressure gas to flow from the chamber 36 through the lost motion valve 39 into the chamber 43, thus causing a quick closing of the main valve. Even if the throttle valve 23 seats, the diaphragm 22 can continue downwardly a slight distance due to the yielding of the spring 32.

It will be seen from this description that the main valve is a quick motion on-and-off valve and that the throttle valve executes its throttling action between the on-and-off position of the lost motion valve 39.

It is obvious that the throttle valve and the main valve do not have to be in the same casing provided the main valve is in series with the throttle valve and provided further that they are interconnected so as to insure their related action as hereinabove described.

In the form shown in Figure 6, the throttle valve body portion is indicated at 57 and the main valve body portion at 58. The inlet port 59 of the throttle valve is connected with the gas mains and its outlet port 60 is connected with the inlet port 61 of the main valve, the main valve having its outlet port 62 connected with the burners as hereinabove described. The throttle valve 63 is connected to the throttle valve diaphragm 64 in exactly the same manner as hereinbefore described and the lost motion valve is connected by lost motion mechanism with the throttle valve diaphragm 64 as previously described. The cage of the lost motion valve is indicated by the reference character 49' and the lost motion valve and the associated mechanism correspond identically with that shown in Figure 3.

The chamber 65 above the throttle valve diaphragm 64 is connected by the bleed line 66 with the gas thermostats 10 and 9, as previously described. The waste pipe from the thermostats, indicated by the reference character 67 in Figures 7 and 8, leads into the waste duct 68 and from there passes to the waste pipe 69 corresponding exactly to the waste pipe 13 of Figure 1. The chamber 70 in the upper casing 71, which corresponds identically with the chamber 36 of the upper casing 34 of Figures 2 and 3, is supplied with gas through the port 72. However, in this case the lost motion valve controls the flow of gas to or from the chamber 73 above the main valve diaphragm 74 being connected thereto by means of the pipe 75, see Figures 6, 7 and 8. The main valve is indicated at 76 and is operated directly from the main valve diaphragm 74.

The operation of the apparatus is identically the same as that previously described. The throttle valve moves slowly upwardly until it actuates the lost motion valve which in turn controls the operation of the diaphragm 74 which operates the main valve 76 so that the main valve 76 opens only after the throttle valve has arrived at its full open position. The throttle valve can execute its throttling action without closing the main valve and when the throttle valve has either completed or practically completed its throttling action, the diaphragm 64 of the throttle valve moves down still farther and actuates the lost motion valve, thus supplying pressure gas to the chamber 73 above the main valve diaphragm 74 and quickly closing the main valve. The main valve, it will be seen, is an on-and-off quick motion valve, whereas the throttle valve operates to throttle the gas flow in exact accordance with the demands.

As in the previous form of the invention, a minimum flow means indicated at 77 in Figure 6 is provided around the throttle valve and is under the direct control of the main valve. This minimum flow may be adjusted, as previously described.

It will be seen that a novel form of modulating valve device has been provided in which the throttle valve is operated by means independent of the main valve, and in which the throttle valve moves to its fully opened position prior to the opening of the main valve, thus preventing any chance of flash-back during lighting of the burners.

Also it will be seen that the main valve stays open independently of the throttle valve while the throttle valve executes its throttling action, and when the throttle valve has completed its throttling action, there is still a minimum flow under the direct control of the main valve. If this minimum flow is too great, as described, the main valve suddenly closes and cuts off even the minimum flow.

Although this invention has been described in considerable detail, it is to be understood that such description is intended as illustrative rather than limiting, as the invention may be variously embodied and is to be interpreted as claimed.

I claim:

1. A modulating pressure operated valve comprising a throttle valve for controlling fluid flow, a first pressure operated motive means for moving said throttle valve, a main valve for controlling said fluid flow, a second pressure operated motive means for moving said main valve, and means controlling the sequential operation of said throttle and main valves for causing said throttle valve to fully open before the main valve opens and for keeping said main valve open until said throttle valve assumes a predetermined partially closed position.

2. A valve device for controlling the flow of pressure fluid comprising a lost motion on-and-off valve, a throttle valve operative for throttling action between the on-and-off positions of said lost motion valve, throttle valve operating means, lost motion, snap action mechanism operatively connecting said throttle valve operating means and said lost motion valve, a main valve in series with said throttle valve, main valve operating means controlled by said lost motion valve for opening said main valve after said throttle valve is approximately fully opened and for closing said main valve after said throttle valve has executed throttling action.

3. A valve device for controlling the flow of pressure fluid comprising a lost motion on-and-off valve, a throttle valve operative for throttling action between the on-and-off positions of said lost motion valve, throttle valve operating means, lost motion, snap action mechanism operatively connecting said throttle valve operating means and said lost motion valve, a main valve in series with said throttle valve, main valve operating means controlled by said lost motion valve for opening said main valve after said throttle valve is approximately fully opened and for closing said main valve after said throttle valve has executed throttling action, said valve device having minimum flow means around said throttle valve and in series with said main valve.

4. A fluid flow valve comprising a throttle valve, means controlled in accordance with the value of a condition for moving said throttle valve in a graduated manner, a lost motion valve operated by said throttle valve operating means and arranged to open and close adjacent the full closed and full open limits, respectively, of the motion of said throttle valve, a main valve in series with said throttle valve, and main valve operating means controlled by said lost motion valve and operative to close said main valve upon opening of said lost motion valve and to open said main valve upon closure of said lost motion valve.

5. A modulating, pressure operated valve comprising a throttling valve for controlling fluid flow, a first pressure operated means for moving said throttling valve, an on-and-off shut-off valve for controlling the said fluid flow, a lost motion valve operated by said first pressure operated means, and a second pressure operated means controlled by said quick motion valve for moving said on-and-off main valve, the extent of lost motion of said lost motion valve being sufficiently great to provide a substantial differential between initial flow just after the shut-off valve is opened and the final flow just before the shut-off valve is reclosed.

6. In combination, a main gas burner, a throttling valve for throttling the flow of gas to said burner, diaphragm motor means connected to said throttling valve for moving the same, means for applying pressure to said diaphragm means, condition responsive means for varying said pressure to vary the position of said throttling valve in accordance with the value of said condition, an on-and-off valve in series with said throttling valve and controlling the flow of fuel through said throttling valve, and a second motor means for quickly moving said shut-off valve between open and closed positions, said throttling valve motor means normally being operative subsequent to a closure of said shut-off valve to cause substantially complete reopening of said throttling valve independently of said shut-off valve so that upon reopening of said shut-off valve, substantially a full flow of gas to the burner occurs initially.

7. In combination, a main gas burner, a throttling valve for throttling the flow of gas to said burner, diaphragm motor means connected to said throttling valve for moving the same, means for applying pressure to said diaphragm means, condition responsive means for varying said pressure to vary the position of said throttling valve in accordance with the value of said condition, an adjustable by-pass around said throttling valve to permit a flow of gas sufficient to support proper combustion even when said throttling valve is closed, an on-and-off shut-off valve in series with said throttling valve and controlling the flow of fuel through both said throttling valve and said by-pass, and a second motor means for quickly moving said shut-off valve between open and closed positions, said throttling valve motor means normally being operative subsequent to a closure of said shut-off valve to cause substantially complete reopening of said throttling valve independently of said shut-off valve so that upon reopening of said shut-off valve, substantially a full flow of gas to the burner occurs initially.

8. In a diaphragm valve assembly, a valve housing having inlet and outlet openings, a partition extending across the valve housing between said inlet and outlet openings, said partition having an aperture therethrough and valve seats on opposite sides of said aperture, a substantially concentric pair of diaphragms extending across said housing one on each side of said partition, a throttling valve secured to one of said diaphragms and adapted to seat on one of said valve seats, a shut-off valve secured to the other of said diaphragms and adapted to seat on the other of said seats whereby the flow of fluid through said passage is controlled by said throttling and shut-off valves in series, and an adjustable by-pass passage around said throttling valve extending through said partition and communicating with the space between said valve seats for maintaining a minimum flow when said throttling valve is closed but said shut-off valve is open.

9. In a diaphragm valve assembly, a valve housing having a main integral section and two outer integral sections, said main section having inlet and outlet openings and a partition wall extending across the valve housing between said inlet and outlet openings, said partition wall having an aperture therethrough and valve seats on opposite sides of said aperture, a substantially concentric pair of main operating diaphragms extending across said housing, one being clamped between said main section and one outer section and the other being clamped between said main section and the other outer section, a throttling valve adapted to seat on one of said valve seats and connected to one of said diaphragms to be operated thereby, a shut-off valve adapted to seat on the other of said seats and connected to the other of said diaphragms to be operated thereby, said throttling and shut-off valves controlling in series the flow of gas through said apertures, passages communicating with chambers formed by said main diaphragms, and a separate pilot valve means associated with each of said diaphragms for controlling the flow of fluid through a passage communicating with a chamber formed by that diaphragm for controlling the position of the valve operated thereby.

10. In a diaphragm valve assembly, a valve housing having a main integral section and two outer integral sections, said main section having inlet and outlet openings and a partition wall extending across the valve housing between said inlet and outlet openings, said partition wall having an aperture therethrough and valve seats on opposite sides of said aperture, a substantially concentric pair of main operating diaphragms extending across said housing, one being clamped between said main section and one outer section and the other being clamped between said main section and the other outer section, a throttling valve adapted to seat on one of said valve seats and connected to one of said diaphragms to be operated thereby, a shut-off valve adapted to seat on the other of said seats and connected to the other of said diaphragms to be operated thereby, said throttling and shut-off valves controlling in series the flow of gas through said apertures, passages communicating with chambers formed by said main diaphragms, a pilot valve controlling the flow of fluid through a passage communicating with a chamber formed by the diaphragm connected to the throttling valve, condition responsive means for varying the position of said pilot valve thereby to vary the position of said throttling valve, a second pilot valve controlling the flow of fluid through a passage communicating with a chamber formed by the diaphragm connected to the shut-off valve, and means operatively connecting said pilot valve with the diaphragm associated with the throttling valve to cause said shut-off valve to be moved between two controlling positions thereof when said throttling valve assumes a predetermined position.

FRANK A. GAUGER.